(No Model.)

C. BARBER.

SHAFT COUPLING.

No. 264,401. Patented Sept. 12, 1882.

Witnesses:
John Grist
N. L. Mager

Inventor:
Chas. Barber
By Henry Grist
Att'y.

United States Patent Office.

CHARLES BARBER, OF MEAFORD, ONTARIO, CANADA, ASSIGNOR OF ONE-HALF TO THOMAS HARRIS, OF SAME PLACE.

SHAFT-COUPLING.

SPECIFICATION forming part of Letters Patent No. 264,401, dated September 12, 1882.

Application filed March 7, 1882. (No model.)

*To all whom it may concern:*

Be it known that I, CHARLES BARBER, of Meaford, in the county of Grey, in the Province of Ontario, in the Dominion of Canada, have invented certain new and useful Improvements in Shaft-Couplings; and I do hereby declare that the following is a full, clear, and exact description of the same.

The object of this invention is to make an elastic coupling for line-shafting which will overcome backlash in gearing and other irregularities of motion caused by the driving-crank of steam-engines or other motors, or the throwing in and out of gear of machinery while running, or concussion caused by sudden stoppage, or any other cause having a tendency to disturb the regular motion of machinery.

My invention consists of a two-part box-coupling, one part having an elastic cushion or packing of rubber in concentric or other suitable recesses and the other part moving concentrically therein, having arms in contact with said cushion or packing, whereby the said two parts of the coupling will yield impulsively to the concussion or sudden impact caused by irregular motion, as before described.

Figure 1:
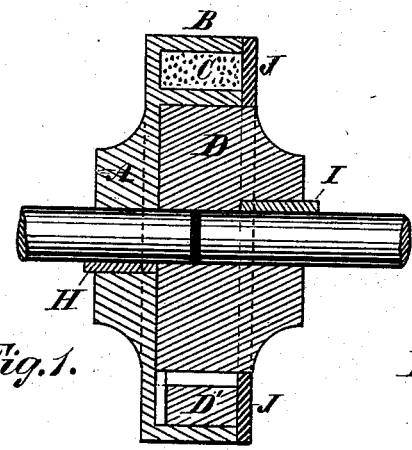
Figure 2:
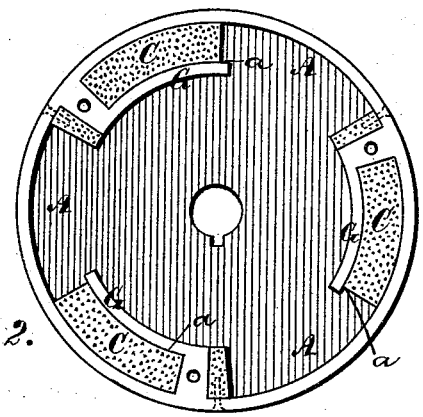
Figure 3:
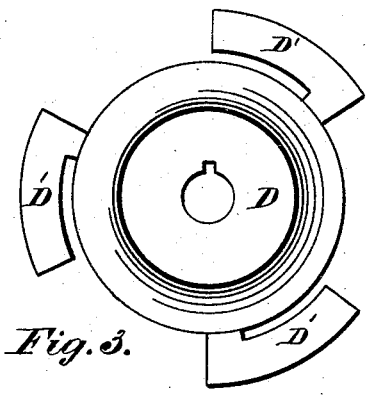
Figure 4:
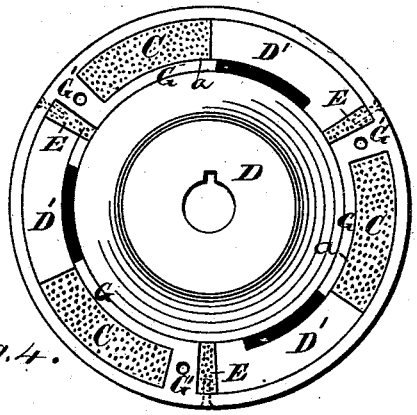
Figure 5:
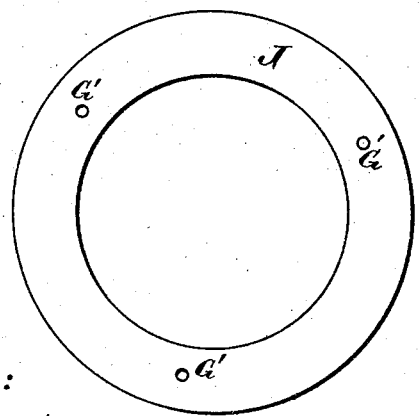

Figure 1 is a section of my improved coupling applied to a line-shaft. Fig. 2 is a plan of one part of the coupling or box or shell, showing the concentric recesses, packing, and noiseless cushions. Fig. 3 is a plan of the other part of the coupling fitting into shell, Fig. 2. Fig. 4 is a plan of the two parts in concentrical position, and Fig. 5 is a plan of an annular ring to cover the open portion seen in Fig. 4.

A is the shell or case, having the rim B of sufficient depth to take the necessary thickness of india-rubber cushions or other elastic packing C, which fits into concentric recesses formed by casting the shell at intervals with concentric arc-shaped sections G, and said shell is keyed on the end of one of the sections of the shaft, to be coupled by a feather, H. D is the other part of the coupling, fitting into and working concentrically in the shell A within the concentric sections G, and is cast with concentric arc-shaped arms D', fitting between the arc-shaped sections G, the extremity of the arms cushioning against the elastic packing C. The part D is keyed through its hub to the other sections of the line-shafting by a feather, I, the ends of the two sections of the shafting being disconnected. Each section or part of the coupling A D can have a concentric movement to the extent of the yielding of the packing C, with which the arms D' have contact, and such yielding will be effected by any sudden impact or concussion of the parts from backlash or other causes previously stated herein, and break the force of the irregular motion or overcome its defect in operating machinery.

J is an annular ring fitting over the hub-section D to cover the elastic packing, and is fastened by screws or bolts passing into or through holes G' at the closed end of the packing recesses. E are elastic cushions, of rubber or packing, interposed between the elbow of the arms D' and sections G to prevent rattling and noise resulting from concussion of the parts by reaction. If desired, the ring may have other forms of fastening and be applied in other ways to cover the recesses and cushions.

I am aware of a device for preventing backlash in which the wheel is constructed with a rim having circumferential flanges projecting upward from the outer and inner edges, respectively, to form a circular channel for hollow rubber springs, said springs being secured together by a circular rod, and having at each end a washer, against which the arms or spokes of the wheel operate, and such I do not claim.

I claim as my invention—

1. The part of shell A having at intervals therein the arc-shaped concentric sections G, forming concentric recesses *a*, the elastic cushions or packing C, and part D, or hub, fitting into the unoccupied part of the shell, and having concentric arc-shaped arms D' fitting between the sections G, the extremity of said arms cushioning directly against the elastic packing C, said shell A being keyed on the end of one of the sections of the shaft and said part D being keyed to the other sections of the shaft, to admit of said parts A D having concentric movement, as set forth.

2. The combination of the shell A, having the arc-shaped concentric sections G formed at intervals therein, and recesses a, elastic packing C, hub D, having arc-shaped arms D', and cushions E, interposed between the arms D' and sections G, arranged to operate substantially as and for the purposes described.

C. BARBER.

Witnesses:
JOHN FEAR,
JOHN LANGMAN.